United States Patent
Yanazawa et al.

(10) Patent No.: US 9,889,805 B2
(45) Date of Patent: Feb. 13, 2018

(54) WIRE HARNESS AND WIRE HARNESS MANUFACTURING METHOD

(71) Applicant: YAZAKI CORPORATION, Tokyo (JP)

(72) Inventors: Kenta Yanazawa, Shizouka (JP); Hideomi Adachi, Shizouka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/423,166

(22) Filed: Feb. 2, 2017

(65) Prior Publication Data

US 2017/0225630 A1    Aug. 10, 2017

(30) Foreign Application Priority Data

Feb. 5, 2016   (JP) ................. 2016-020410

(51) Int. Cl.
*H02G 3/04* (2006.01)
*B60R 16/02* (2006.01)
*H02G 1/08* (2006.01)

(52) U.S. Cl.
CPC ........... *B60R 16/0207* (2013.01); *H02G 1/08* (2013.01); *H02G 3/0468* (2013.01); *Y10S 903/904* (2013.01)

(58) Field of Classification Search
CPC .. H02G 3/0481; H02G 3/0487; H02G 3/0691; H02G 3/04; H02G 3/0406; H02G 3/0608; H02G 3/0616; H02G 1/08; H02G 3/0468; H02G 3/00; H02G 3/02; H01B 7/20; H01B 7/202; H01B 7/00; F16L 13/02; F16L 21/00; F16L 23/036; F16L 57/00; F16L 23/006; B60R 16/0215; B60R 16/02; B60R 16/0207
USPC ......... 174/72 A, 72 R, 74 R, 88 R, 70 C, 95, 174/68.1, 68.3; 138/111, 140, 141, 142; 285/238, 239, 242, 343
See application file for complete search history.

(56) References Cited

U.S. PATENT DOCUMENTS

| 6,051,789 | A | * | 4/2000 | Kato ................... | B60R 16/0215 174/72 A |
| 8,569,622 | B2 | * | 10/2013 | Katou ................. | B60R 16/0215 174/72 A |
| 9,616,827 | B2 | * | 4/2017 | Oga .................... | B60R 16/0215 |
| 9,627,102 | B2 | * | 4/2017 | Adachi ............... | B60R 16/0215 |
| 9,627,104 | B2 | * | 4/2017 | Sugimoto ........... | B60R 16/0215 |

(Continued)

FOREIGN PATENT DOCUMENTS

JP    2011-254614 A    12/2011

*Primary Examiner* — Angel R Estrada
(74) *Attorney, Agent, or Firm* — Kenealy Vaidya LLP (57) ABSTRACT

A wire harness includes a tubular external member and one or a plurality of conduction paths inserted into the external member and protected by the external member. The external member includes at least one fixed form insertion part in which an inside width is wider than an outside width of the one or the plurality of conduction paths, and a plurality of narrow-width insertion parts which are elastically deformable and in which an inside width is narrower than the outside width of the one or the plurality of conduction paths. The plurality of narrow-width insertion parts are arranged along a tube axial direction alternately and integrally with the at least one fixed form insertion part.

4 Claims, 9 Drawing Sheets

(56) References Cited

U.S. PATENT DOCUMENTS 9,640,957 B2\* 5/2017 Inao .................... B60R 16/0215
2011/0297415 A1 12/2011 Katou et al.

\* cited by examiner

WIRE HARNESS AND WIRE HARNESS MANUFACTURING METHOD

CROSS REFERENCE TO RELATED APPLICATIONS

This application claims priority from Japanese Patent Application No. 2016-020410 filed on Feb. 5, 2016, the entire contents of which are incorporated herein by reference.

BACKGROUND OF THE INVENTION

Field of the Invention

The invention relates to a wire harness including a resin-made tubular exterior member and one or a plurality of conduction paths to be inserted into and protected by the exterior member.

Description of Related Art

For electrical connection between apparatuses mounted on a car, there is used a wire harness. The wire harness includes a tubular exterior member and one or a plurality of conduction paths to be stored in the exterior member. For example, a wire harness disclosed in the below-cited patent document 1 is arranged to pass through the vehicle under-floor of a car. Such part of the wire harness as corresponds to the vehicle under-floor is arranged straight. This type wire harness is formed long. Here, the below-cited patent 1 shows the following matter relating to the straight arranged part. That is, it shows that the conduction paths within the exterior member are caused to vibrate due to the vibrations of the car while running.

[Patent Document 1] JP-A-2011-254614

According to a related art, when conduction paths within an exterior member are caused to vibrate due to the vibrations of a car while running, a coating of the conduction path (in the case that the coating has a shield function, braid or a metal foil existing on an outside of the conduction path) can be strongly butted against a tube inner surface of the exterior member to be thereby damaged.

Here, it seems that the above problem can be solved by reducing the inside diameter of the exterior member or by providing an inclusion within the exterior member to thereby eliminate a clearance between the inner surface of the exterior member and conduction path. However, to reduce the inside diameter of the exterior member or to provide the inclusion makes difficult an operation to insert the conduction path into the exterior member. Also, when the conduction path is inserted forcedly, there is raised a problem that the coating of the conduction path can be worn.

SUMMARY

One or more embodiments provide a wire harness which, while paying attention to workability concerning insertion of a conductive path, can suppress vibrations of the conduction path within an exterior member.

Means for Solving the Problems

One or more embodiments provide a wire harness including a tubular external member and one or a plurality of conduction paths inserted into the external member and protected by the external member. The external member includes at least one fixed form insertion part in which an inside width is wider than an outside width of the one or the plurality of conduction paths, and a plurality of narrow-width insertion parts which are elastically deformable and in which an inside width is narrower than the outside width of the one or the plurality of conduction paths. The plurality of narrow-width insertion parts are arranged along a tube axial direction alternately and integrally with the at least one fixed form insertion part.

In accordance with one or more embodiments, the plurality of narrow-width insertion parts may reduce a play rate of the conduction path in the exterior member so as to suppress a vibration of the conduction path, may have bellows tube shapes respectively, and may regulate a bending direction of the wire harness.

According to one or more embodiments, due to employment of the exterior member having the structure that the fixed form insertion part(s) and elastic narrow-width insertion parts are arranged alternately with each other along the tube axial direction, in the narrow-width insertion parts, the elastically deformed narrow-width insertion parts are going to return to their original states, thereby being able to press the conduction path after inserted. Thus, when the narrow-width insertion parts are arranged to locations where occurrence of the vibration of the conduction path is easy to occur, relative vibrations between the conduction path and external member can be suppressed. Meanwhile, in the fixed form insertion part(s), since the inside width thereof is wider than the outside width of the conduction path, even without any particular operation, an operation to insert the conduction path can be performed smoothly.

According to one or more embodiments, when the narrow-width insertion parts are arranged to locations where occurrence of the vibration of the conduction path is easy to occur, the vibrations of the conduction path within the external member can be suppressed. This makes it possible to prevent the damage of the coating of the conduction path (in the case that it has a shield function, braid or a metal foil existing on the outside of the conduction path). Also, according to the invention, not only the narrow-width insertion parts but also the fixed form insertion parts are formed as the exterior member, workability concerning insertion of the conductive path can be enhanced. That is, since, when inserting the conduction path, only the narrow-width insertion parts may be elastically deformed, for example, when compared with a structure in which narrow-width insertion parts are formed over the entire area of an exterior member, workability concerning insertion of the conductive path can be enhanced remarkably.

According to one or more embodiments, the narrow-width insertion parts can be formed further better.

BRIEF DESCRIPTION OF THE DRAWINGS

FIGS. 3A to 3F are section views of the harness main body of FIG. 2.

FIGS. 4A and 4B are explanatory views of the operation of the narrow-width insertion parts in FIG. 2 and FIGS. 3A to 3F.

FIGS. 5A and 5B are explanatory views of the operation of the narrow-width insertion parts in FIG. 2 and FIGS. 3A to 3F.

FIGS. 7A to 7F are section views of the harness main body of FIG. 6.

FIG. 9A to 9F are section views of the harness main body of FIG. 8.

DETAILED DESCRIPTION

A wire harness includes a tubular exterior member and one or a plurality of conduction paths to be inserted into and protected by the exterior member. The exterior member includes a plurality of fixed form insertion parts and a plurality of narrow-width insertion parts arranged alternately and integrally with each other along the tube axial direction of the exterior member. The fixed form insertion parts are formed in the parts of the exterior member where the inside width of the exterior member is wider than the outside width of the conduction path. Meanwhile, the narrow-width insertion parts are formed in the parts where the inside width of the exterior member is narrower than the outside width of the conduction path. The narrow-width insertion parts are formed in the parts that, when the conduction part is inserted, can be elastically deformed. When the conduction path is inserted into the exterior member, the elastically deformed narrow-width insertion parts are going to return to their original states and thus press the conduction path, thereby suppressing relative vibration between the conduction path and exterior member.

A wire harness includes an external member having a tubular shape and a conduction path inserted into the external member. The external member includes a fixed form insertion part and a narrow-width insertion part. In the fixed form insertion part, an inside width of the external member is larger than an outside width of the conduction path throughout a whole circumference of the conduction path. In the narrow-width insertion part, two points of an inner circumference of the external member elastically press corresponding points of an outer circumference of the conduction path toward radially inner sides of the conduction path to each other. The fixed form insertion part and narrow-width insertion part are alternatively arranged along a tube axial direction. The fixed form insertion part and the narrow-width insertion part are integrally formed.

A manufacturing method for a wire harness including a tubular external member and a conduction path, the wire harness is manufactured by:

preparing the external member, including a fixed form insertion part and a narrow-width insertion part which are alternatively arranged along a tube axial direction, the external member having an inside width which is larger than an outside width of the conduction path throughout a whole circumference of the conduction path, and the narrow-width insertion part having an inside width which is narrower than the outside width of the conduction path; and inserting the conduction path into the exterior member while deforming the narrow-width insertion part.

Embodiment 1

Figure 1A:
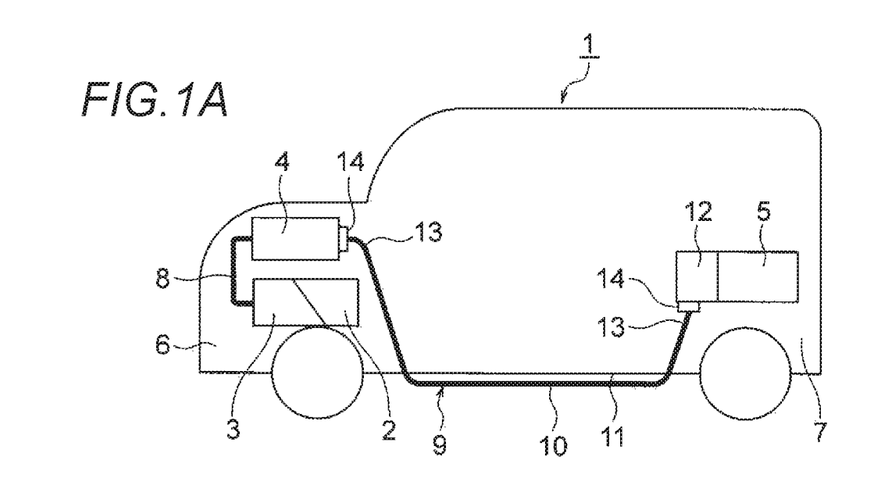
FIG. 1A is a schematic view of the arranged state of a high voltage wire harness.
Figure 1B:
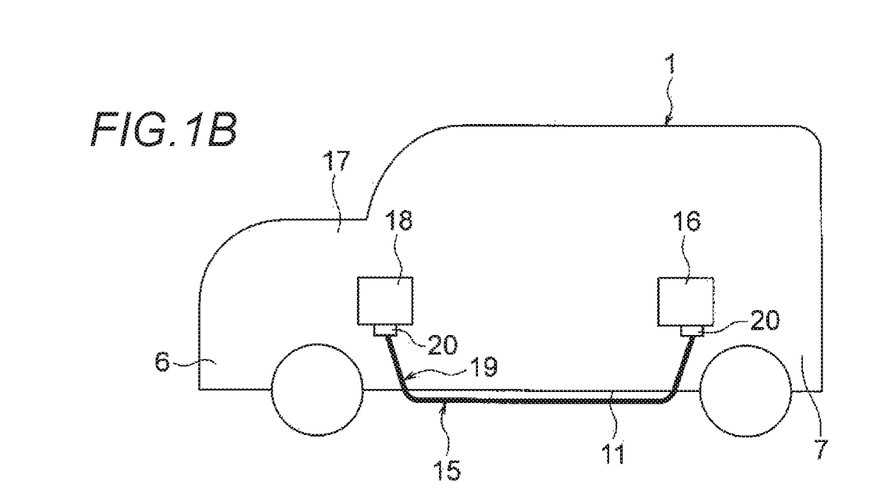
FIG. 1B is a schematic view of the arranged state of a low voltage wire harness different from one of FIG. 1A (embodiment 1).
Figure 2:
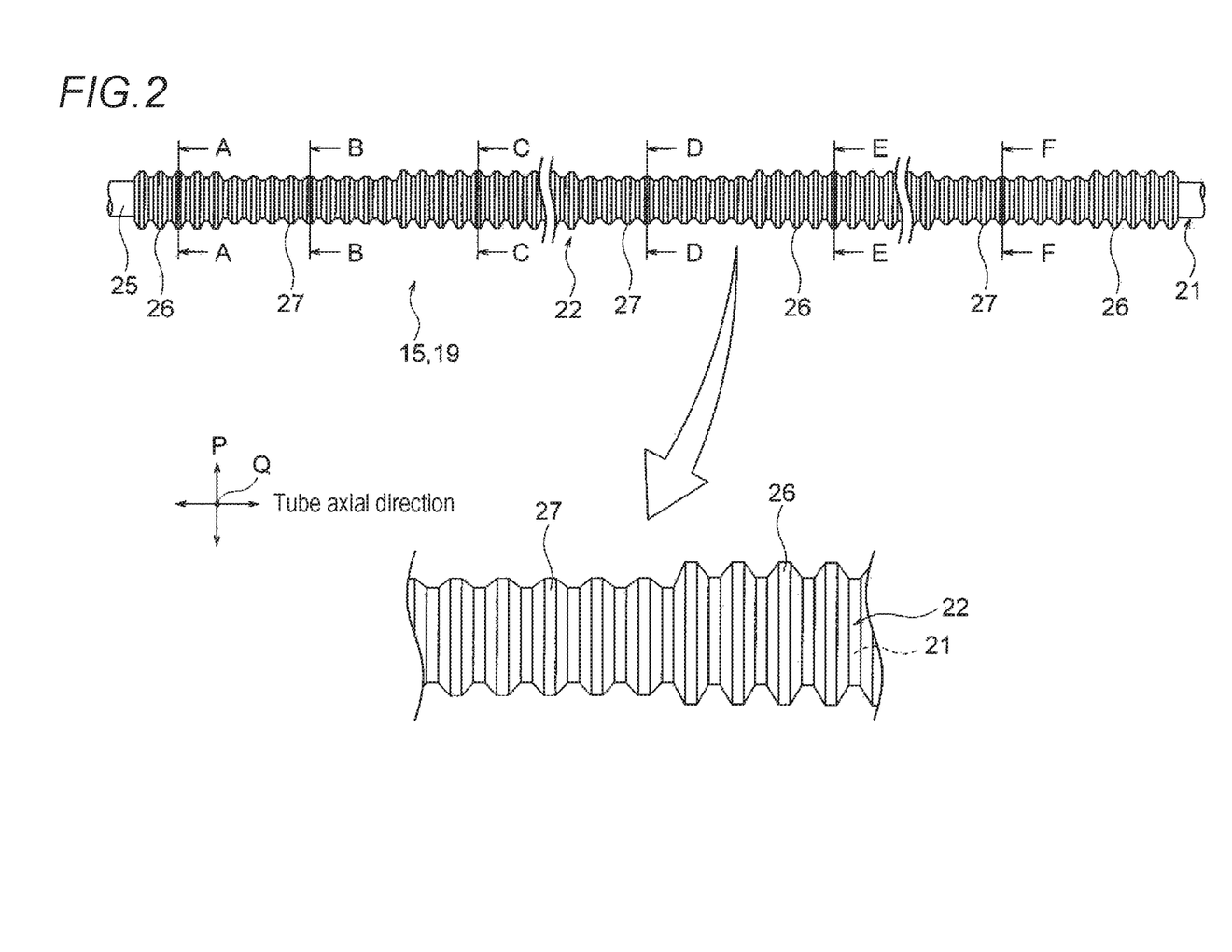
FIG. 2 is a front view of a harness main body constituting the wire harness.
Figure 3A:
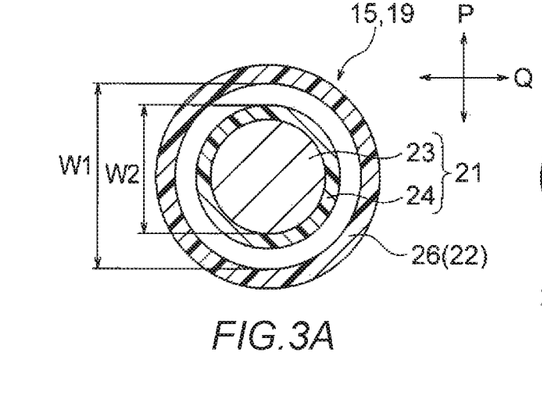
FIG. 3A is a section view taken along the A-A arrow line of FIG. 2.
Figure 3B:
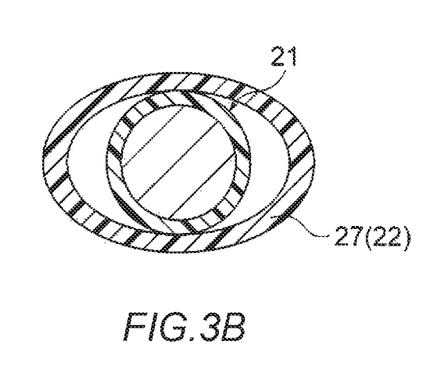
FIG. 3B is a section view taken along the B-B arrow line of FIG. 2.
Figure 3C:
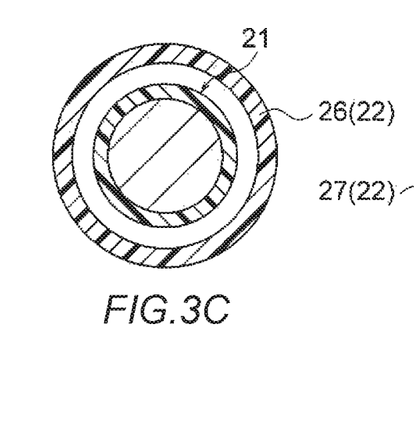
FIG. 3C is a section view taken along the C-C arrow line of FIG. 2.
Figure 3D:
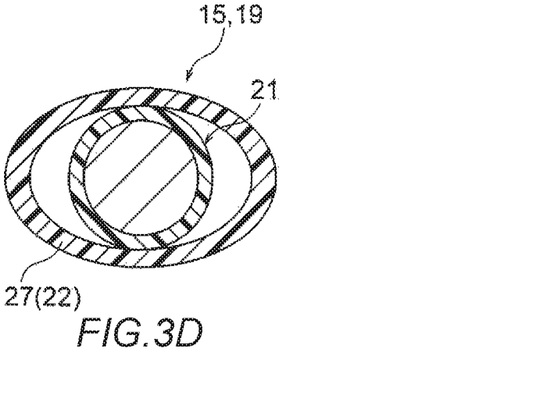
FIG. 3D is a section view taken along the D-D arrow line of FIG. 2.
Figure 3E:
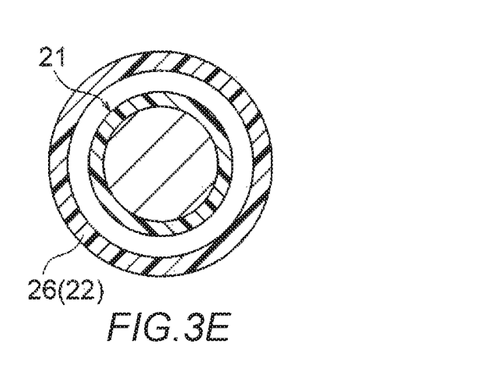
FIG. 3E is a section view taken along the E-E arrow line of FIG. 2.
Figure 3F:
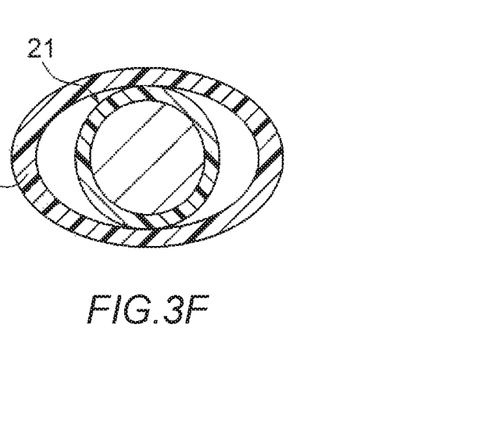
FIG. 3F is a section view taken along the F-F arrow line of FIG. 2 (embodiment 1).

Description is given below of an embodiment 1 with reference to the drawings. FIGS. 1A and 1B show a wire harness according to the invention. Specifically, FIG. 1A is a schematic view of the arranged state of a high voltage wire harness; and, FIG. 1B is a schematic view of the arranged state of a low voltage wire harness different from one of FIG. 1A. Also, FIG. 2 is a front view of a harness main body constituting the wire harness of the invention, FIGS. 3A to 3F are section views of the harness main body of FIG. 2, and FIGS. 4A and 4B and 5A and 5B are explanatory views of the operation of narrow-width insertion parts shown in FIG. 2 and FIGS. 3A to 3F.

In this embodiment, the invention is employed in a wire harness which is arranged in a hybrid car (which may also be an electric car or a general car structured to run on an engine).

<Structure of Hybrid Car 1>

In FIG. 1A, reference numeral 1 designates a hybrid car. The hybrid car 1 is a vehicle to be driven by mixing together two kinds of power from an engine 2 and a motor unit 3, while power from a battery 5 (battery pack) is supplied to the motor unit 3 through an inverter unit 4. The engine 2, motor unit 3 and inverter unit 4, in this embodiment, are mounted in an engine room 6 where front wheels and so on are provided. Also, the battery 5 is mounted in a car rear part 7 where rear wheels and so on are provided (it may also be mounted within a car interior existing behind the engine room 6).

The motor unit 3 and inverter unit 4 are connected together by a high voltage wire harness 8 (a motor cable for a high voltage). The battery 5 and inverter unit 4 are also connected together by a high voltage wire harness 9. The intermediate part 10 of the wire harness 9 is arranged along the vehicle under-floor 11 of a vehicle (a vehicle body). The intermediate part 10 is also arranged along the vehicle under-floor 10 substantially in parallel thereto. The vehicle under-floor 10 is a known body (vehicle body) and is also a so called panel member, while it has a through hole in a specific position. The wire harness 9 is watertight inserted into this through hole.

The wire harness 9 and battery 5 are connected together through a junction block 12 provided on this battery 5. To the junction block 12, there is electrically connected an external connection device such as a shield connector 14 provided on a harness terminal 13 disposed on the rear end side of the wire harness 9. Also, the wire harness 9 and inverter unit 4 are electrically connected together through an external connection device such as a shield connector 14 provided on a harness terminal 13 disposed on the front end side.

The motor unit 3 includes a motor and a generator. Also, the inverter unit 4 includes an inverter and a converter. The motor unit 3 is formed as a motor assembly including a shield case. The inverter unit 4 is also formed as an inverter assembly including a shield case. The battery 5 is produced by modulizing a Ni-MH based material or a Li-ion based material. Here, a power storage device such as a capacitor can also be used. The battery 5, of course, is not particularly limited so long as it can be used in the hybrid car 1 or an electric car.

In FIG. 1B, reference numeral 15 designates a wire harness. The wire harness 15 is one for a low pressure (for a low voltage) and is provided in order to connect electrically a low voltage battery 16 disposed in the car rear part 7 of the hybrid car 1 to an auxiliary device 18 (equipment) to be mounted in the car front part 17. The wire harness 15, similarly to the wire harness 9 of FIG. 1A, is arranged through the vehicle under-floor 11 (this is an example and it may also be arranged through the cabin side).

As shown in FIGS. 1A and 1B, in the hybrid car 1, there are arranged the wire harnesses 8, 9 for a high voltage and the wire harness 15 for a low voltage. Although the invention can be applied to both types of wire harnesses, as a typical example, the low voltage wire harness 15 is described below. Firstly, description is given of the structure of the wire harness 15.

<Structure of Wire Harness 15>

In FIG. 1B, the long wire harness 15 to be arranged through the vehicle under-floor 11 includes a harness main body 19 and two connectors 20 respectively to be arranged in the two ends of the harness main body 19. The wire harness 15 further includes a fixing member (for example, a clamp) for arranging the wire harness 15 in a specified position, and a water stop member (for example, a grommet) (not shown).

<Structure of Harness Main Body 19>

In FIG. 2 and FIGS. 3A to 3F, the harness main body 19 includes a conduction path 21 and an exterior member 22 for storing and protecting the conduction path 21. Here, with respect to the number of conduction paths 21, in this embodiment, there is used one conduction path but this is just an example (the number thereof may also be two or three). Also, as the exterior member 22, there may also be employed an exterior member capable of storing and protecting the high voltage wire harness 9 together with the wire harness 15.

<Conduction Path 21>

In FIG. 2 and FIGS. 3A to 3F, the conduction path 21 includes a conductor 23 and an insulator 24 for covering the conductor 23. The conductor 23 is formed of copper or copper alloy, or aluminum or aluminum alloy, while it has a circular section. The conductor 23 may have a conductor structure in which strands are twisted together or a conductor structure in which a rod-shaped conductor has a rectangular or circular (round) section (for example, a conductor structure in which a conductor has a straight angle single core or a round single core; in this case, an electric wire itself provides a rod-shaped wire). On the outer surface of the above-structured conductor 23, there is extrusion molded the insulator 24 made of insulating resin material.

The insulator 24 is extrusion molded on the outer peripheral surface of the conductor 23 using thermoplastic resin material. The insulator 24 is formed as a cover having a circular section and having a specified thickness. As the thermoplastic resin material, various kinds of known material can be used, and the material is properly selected from polymer materials, for example, polyvinyl chloride resin, polyethylene resin, and polypropylene resin. Here, reference numeral 25 designates the outer peripheral surface of the conduction path 21 (here, it corresponds to the outer peripheral surface of the insulator 24).

<Exterior Member 22>

In FIG. 2, the exterior member 22 is formed by resin molding as a single straight tubular body (it is straight before use. After insertion of the conduction path 21, it can be bent in a proper position to the shape of its arranging part). Also, the exterior member 22 is formed into a shape with its body not cut (in other words, a shape with no slit (a shape which is not the shape of a split tube)). Further, the exterior member 22 is formed, as a whole, to have a bellows tube shape (this shape is just an example. A tubular shape with no uneven portions, or a shape consisting of a combination of the tubular shape and the bellows tube shape may also be employed). Here, the "bellows tube shape" means that it includes a bellows concave part and a bellows convex part respectively extending in the peripheral direction, while these bellows concave and bellows convex parts continue alternately with each other in the tube axial direction.

The exterior member 22 is formed to have such a shape shown in FIG. 2 as includes a plurality of fixed form insertion parts 26 and a plurality of narrow-width insertion parts 27. The plurality of fixed form insertion parts 26 and narrow-width insertion parts 27 are arranged along the tube axial direction (in FIG. 2, in the longitudinal direction) of the exterior member 22 alternately and integrally with each other. In this embodiment, the fixed form insertion part 26 is formed to have a complete round cross section shape and the narrow-width insertion part 27 is formed to have an oval cross section shape (however, the shape is not limited to the complete round shape and oval shape).

<Fixed Form Insertion Part 26>

In FIG. 2 and FIGS. 3A to 3F, the fixed form insertion part 26 is formed in the part of the exterior member 22 where the inside width W1 of the exterior member 22 is wider than the outside width W2 of the conduction path 21 (W1>W2). In other words, the fixed form insertion part 26 is formed in the part having the same shape as a known round corrugated tube. Also, it is formed in the part that can be bent 3600 around the tube axis. Further, it is formed in the part through which the conduction path 21 can be inserted smoothly. Here, although it is hard to understand from FIG. 2, in this embodiment, the exterior member 22 is formed to have a structure where the fixed form insertion parts 26 occupy most of the exterior member 22.

<Narrow-Width Insertion Part 27>

In FIGS. 2 to 4B, the narrow-width insertion part 27 is formed in a part such as the vehicle under-floor 11 (see FIGS. 1A and 1B) which is easy to vibrate. Such narrow-width insertion part 27 is formed in the part of the exterior member 22 where the inside width W3 of the exterior member 22 (the inside width W3 on the minor diameter side of the elliptical shape) is narrower than the outside width W2 of the conduction path 21 (W2>W3). Also, it is formed in the part that, in insertion of the conduction path 21, can be elastically deformed in the arrow line P direction. In other words, it is formed in the part where it pinches and presses the conduction path 21 due to the elasticity thereof (see FIGS. 5A and 5B). That is, it is formed as a part which reduces the play rate of the conduction path 21 in the exterior member 20 (in the inside width W3 direction) to suppress the vibration thereof (which may also be called a vibration suppressing section).

In FIG. 2 and FIGS. 3A to 3F, the narrow-width insertion parts 27 are all formed in an oval cross section shape oblong in the arrow line Q direction. In other words, the narrow-width insertion parts 27 are all formed in the parts that have the same shape and can be bent only in the same direction (the structure where all of the narrow-width insertion parts 27 have the same shape is just an example. For example, the shapes of embodiments 2 and 3 to be discussed later may also be employed and the bending direction thereof may be changed properly). The narrow-width insertion part 27 of this embodiment is formed also as a part to regulate the bending direction. Here, with respect to the position of the narrow-width insertion parts 27, in this embodiment, they are arranged at arbitrary positions but this is not limitative, for example, they may also be arranged at regular pitches.

<Manufacturing Method of Wire Harness 19 and Operation of Narrow-Width Insertion Part 27>

Next, description is given of the manufacturing method of the wire harness 15 (the manufacturing method of the harness main body 19), and the operation of the narrow-width insertion path 27 according to the above structure.

Figure 4A:
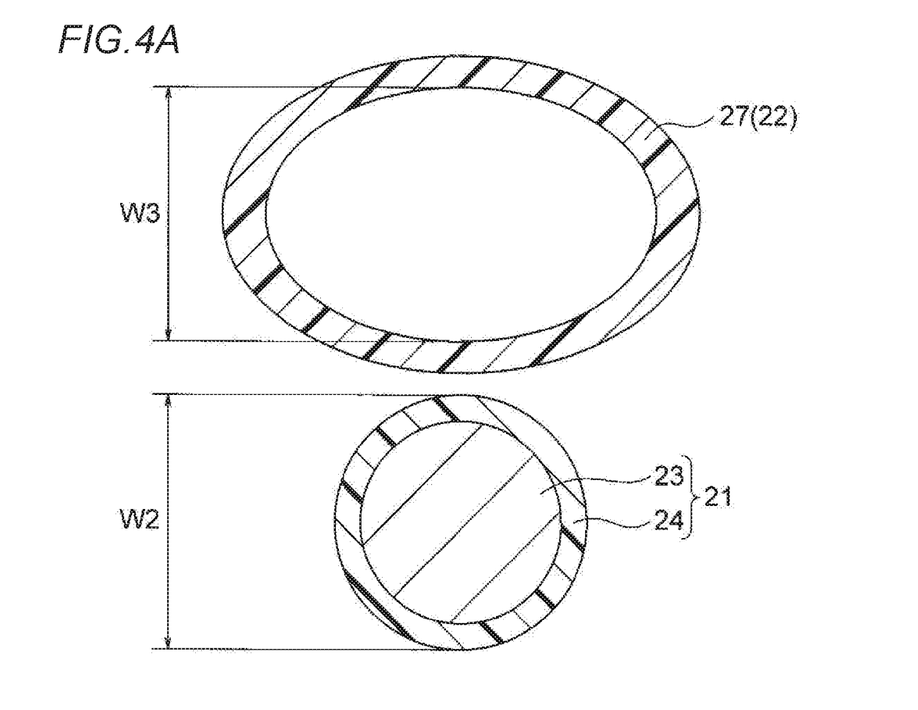
FIG. 4A is a section view thereof in a state where the external member and conduction path are prepared.
Figure 4B:
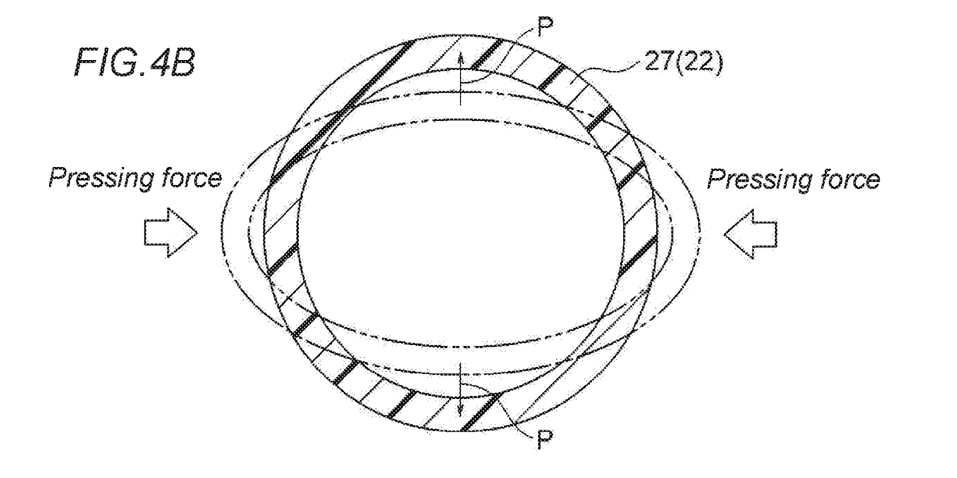
FIG. 4B is a section view thereof in a state where the narrow-width insertion parts are elastically deformed (embodiment 1).

In FIGS. 1A and 1B, in the wire harness 15, the part thereof constituting the harness main body 19 is manufactured first. And, the terminal part thereof is worked next. In FIG. 2, the part constituting the harness main body 19 is manufactured by inserting the conduction path 21 from the one-end opening of the exterior member 22 toward the other-end opening thereof. Specifically, as shown in FIG. 4A, there are prepared the conduction part 21 and exterior member 22 and, after then, while inserting the conduction path 21 into the exterior member 22, the narrow-width insertion part 27 is elastically deformed as shown in FIG. 4B. The narrow-width insertion part 27, on receiving a pressing force from a thick arrow line, is elastically deformed from a shape having a substantially oval section to a shape having a substantially circular section.

Figure 5A:
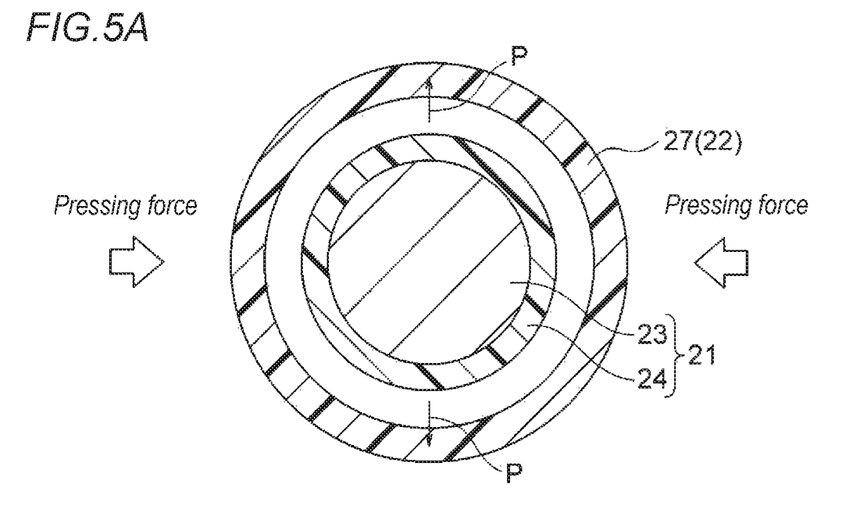
FIG. 5A is a section view thereof in a state where the conduction path is inserted into the elastically deformed narrow-width insertion parts.
Figure 5B:
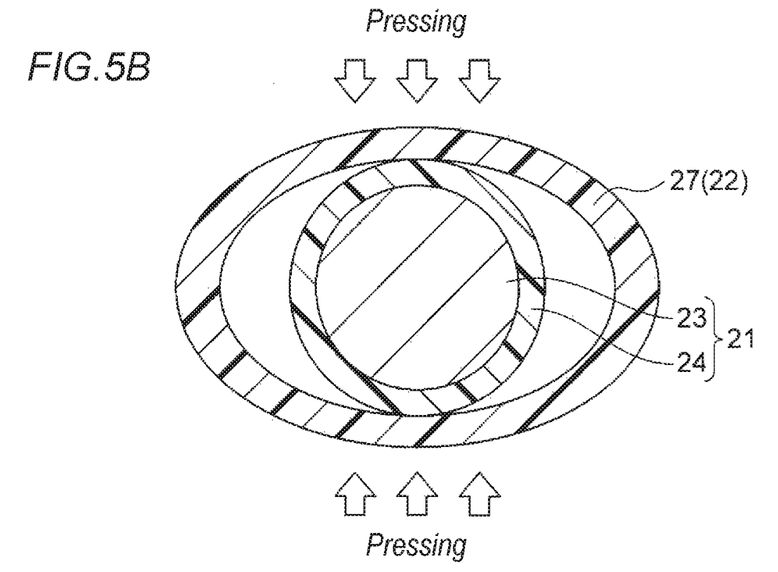
FIG. 5B is a section view thereof in a state where the narrow-width insertion parts are going to return to their original states to thereby press the conduction path (embodiment 1).

When the narrow-width insertion part 27 is elastically deformed into the substantially circular-section shape, insertion of the conduction path 21 is possible, thereby providing such insertion state as shown in FIG. 5A. And, when the pressing force from the thick arrow line is released, as shown in FIG. 5B, the narrow-width insertion part 27 is going to return to its original state, thereby pressing the conduction path 21. Such pressing becomes possible because, in the exterior member 22, the inside width W3 of the narrow-width insertion part 27 is narrower than the outside width W2 of the conduction path 21.

Summary and Effects of the Invention

As has been described heretofore with reference to FIGS. 1A to 5B, according to the wire harness 15 of the invention, due to employment of the exterior member 22 having the structure including the fixed form insertion parts 26 and elastic narrow-width insertion parts 27 along the tube axial direction, in the parts serving as the narrow-width insertion parts 27, the narrow-width insertion parts 27 are going to return to their original states, thereby enabling pressing of the conduction path 21 after inserted. Therefore, when the narrow-width insertion parts 27 are arranged to locations where the vibrations of the conduction path 21 are easy to occur, advantageously, relative vibration between the conduction path 21 and exterior member 22 can be suppressed. This can advantageously prevent the damage of the coating (in the case that it has a shield function, the braid or metal foil on the outside of the conduction path 21) of the conduction path 21.

Also, according to the wire harness 15 of the invention, since not only the narrow-width insertion parts 27 but also the fixed form insertion parts 26 are formed as the exterior member 22, advantageously, workability concerning insertion of the conduction path 21 can be enhanced. That is, since, in insertion of the conduction path 21, only the narrow-width insertion parts 27 may be elastically deformed, for example, when compared with a structure where the narrow-width insertion parts 27 are formed in the entire part of the exterior member 22, advantageously, workability concerning insertion of the conductive path 21 can be remarkably enhanced.

Embodiment 2

Figure 6:
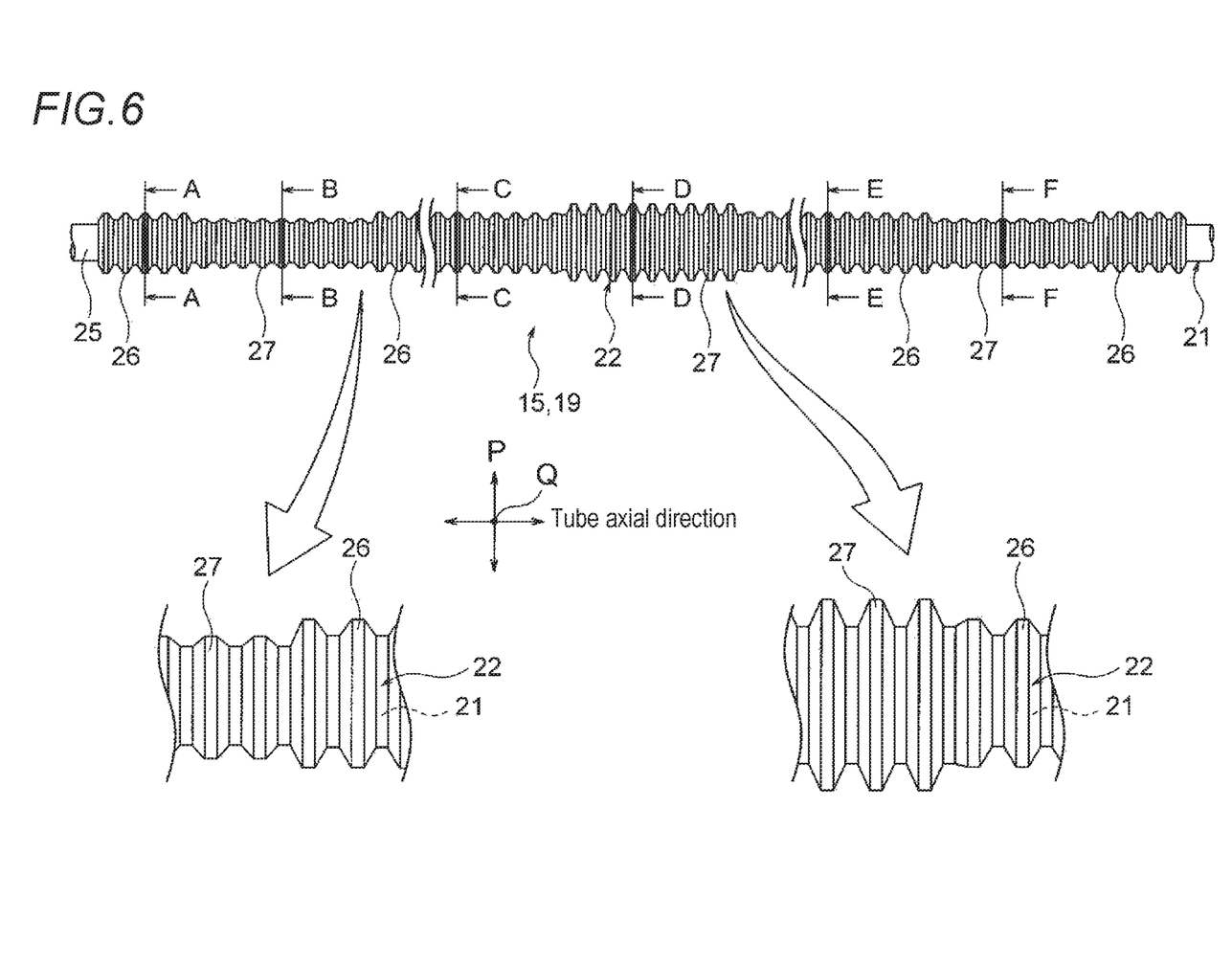
FIG. 6 is a front view of a harness main body constituting a wire harness according to a second embodiment (embodiment 2).
Figure 7A:
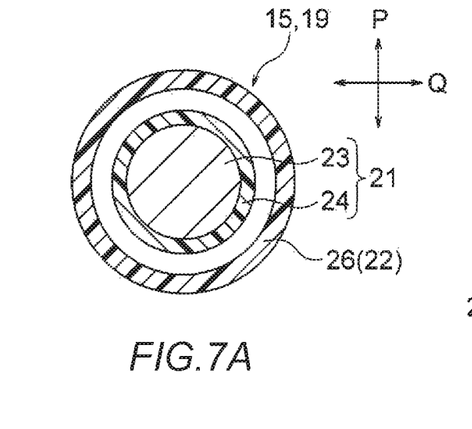
FIG. 7A is a section view taken along the A-A arrow line.
Figure 7B:
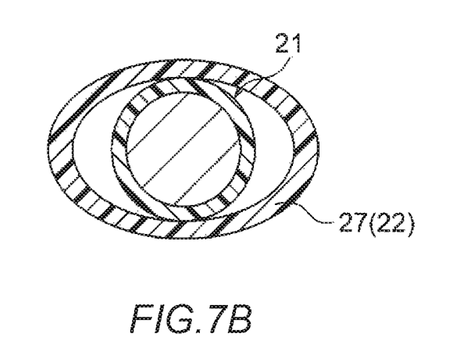
FIG. 7B is a section view taken along the B-B arrow line.
Figures 7C, 7F:
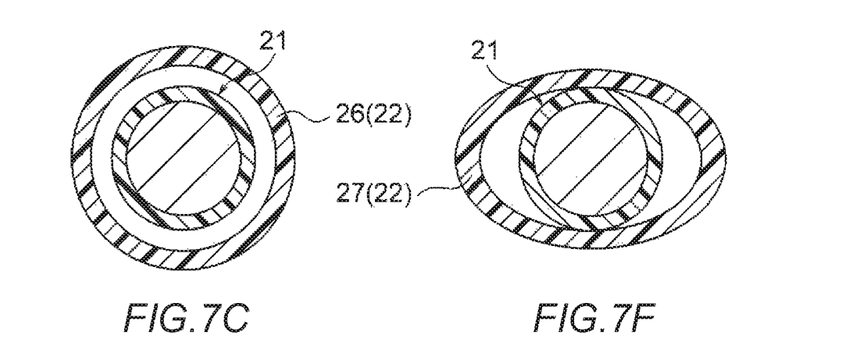
FIG. 7C is a section view taken along the C-C arrow line.
FIG. 7F is a section view taken along the F-F arrow line (embodiment 2).
Figure 7D:
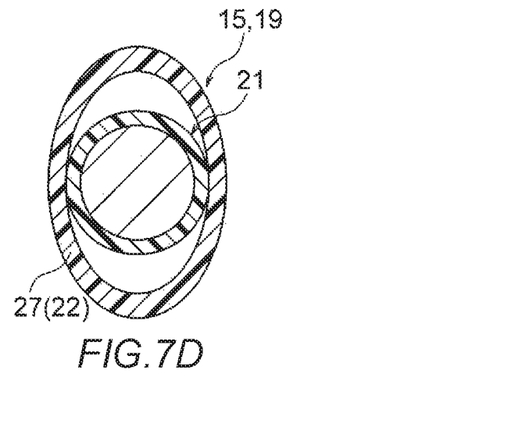
FIG. 7D is a section view taken along the D-D arrow line.
Figure 7E:
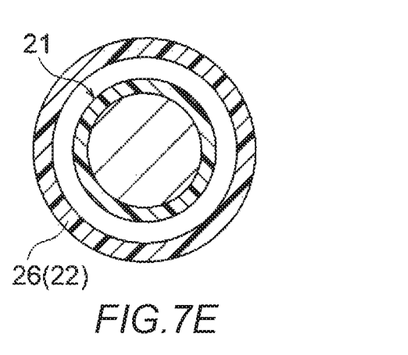
FIG. 7E is a section view taken along the E-E arrow line.

Description is given below of an embodiment 2 with reference to the drawings. FIG. 6 is a front view of a harness main body constituting a wire harness according to a second embodiment of the invention. Also, FIGS. 7A to 7F are section views of the harness main body of FIG. 6. Here, the composing parts of this embodiment, which are basically the same as those of the embodiment 1, are given the same designations and the detailed description thereof is omitted.

<Structure of Wire Harness 15>

In FIG. 6 and FIGS. 7A to 7F, a harness main body 19 constituting a long wire harness 15 includes a conduction path 21 and an exterior member for storing and protecting the conduction path 21. In the exterior member 22, there are formed a plurality of fixed form insertion parts 26 and a plurality of narrow-width insertion parts 27 which are the characteristic part of the invention. The plurality of narrow-width insertion parts 27, in the embodiment 2, are formed such that oval section shapes oblong in the arrow line Q direction and circular section shapes vertically long in the arrow line P direction are alternately arranged. In other words, the narrow-width insertion parts 27 are formed such that the bending direction thereof can be changed properly.

Effects of Embodiment 2

The embodiment 2, of course, provides a similar effect to the embodiment 1. That is, advantageously, while paying attention to workability concerning insertion of the conduction path 21, vibration of the conduction path 21 within the exterior member 22 can be suppressed.

Embodiment 3

Figure 8:
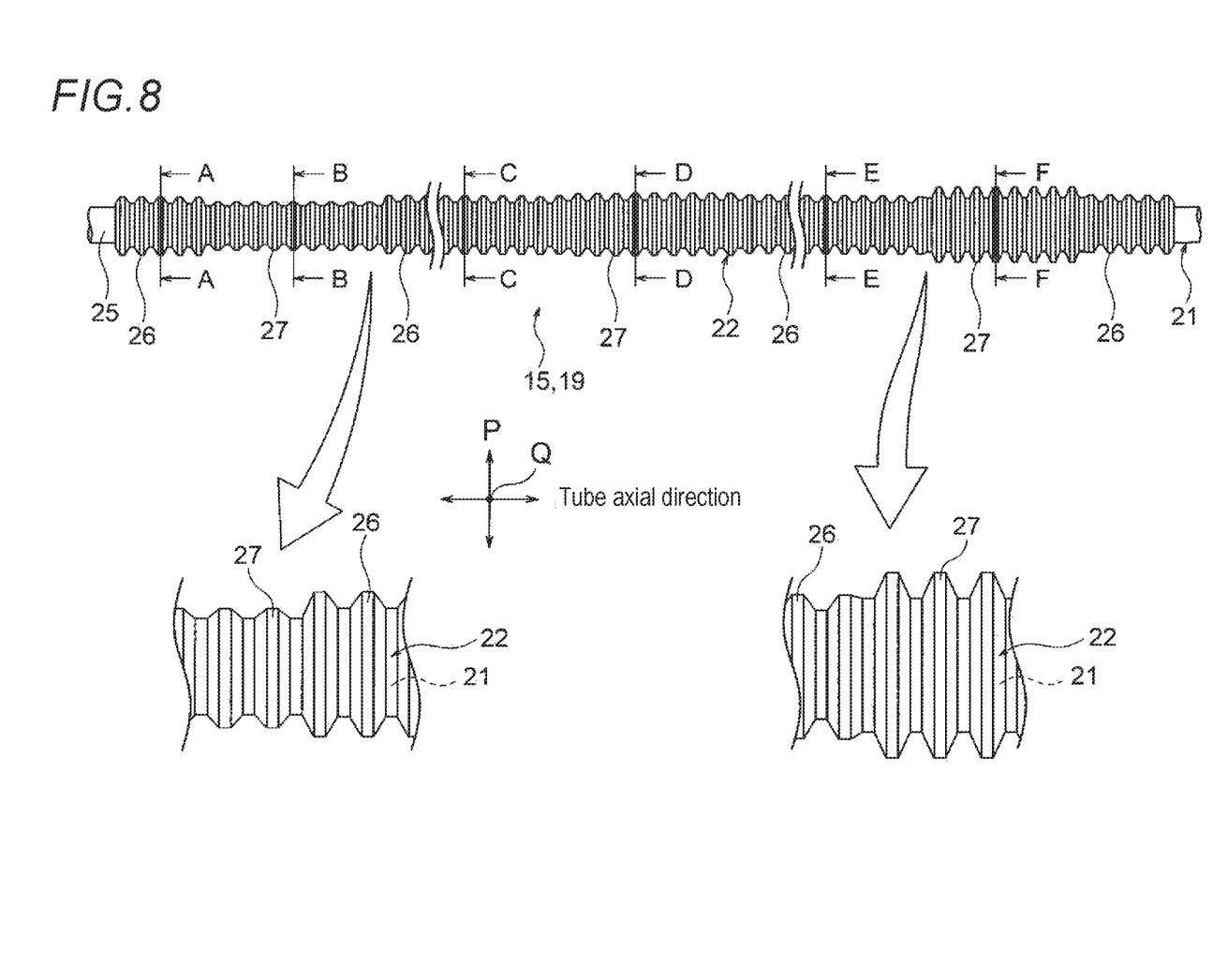
FIG. 8 is a front view of a harness main body constituting a wire harness according to a third embodiment of the invention (embodiment 3).
Figure 9A:
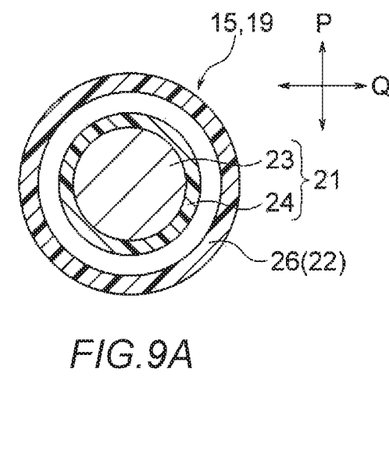
FIG. 9A is a section view taken along the A-A arrow line.
Figure 9B:
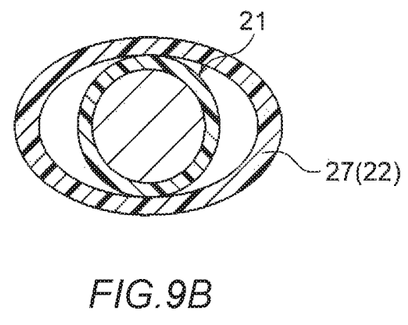
FIG. 9B is a section view taken along the B-B arrow line.
Figures 9C, 9F:
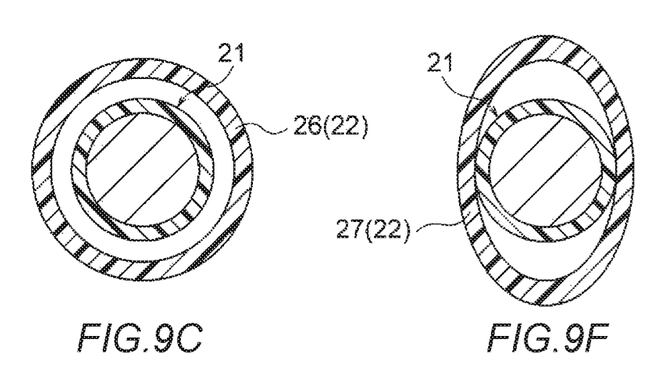
FIG. 9C is a section view taken along the C-C arrow line.
FIG. 9F is a section view taken along the F-F arrow line (embodiment 3).
Figure 9D:
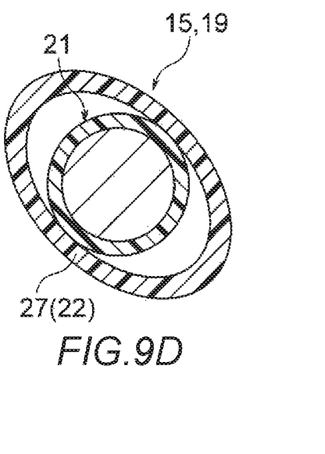
FIG. 9D is a section view taken along the D-D arrow line.
Figure 9E:
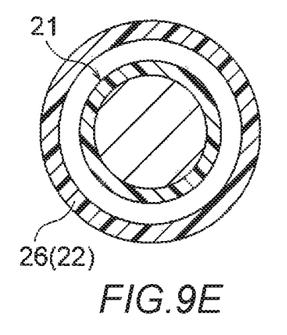
FIG. 9E is a section view taken along the E-E arrow line.

Description is given below of an embodiment 3 with reference to the drawings. FIG. 8 is a front view of a harness main body of a wire harness according to a third embodiment of the invention. Also, FIGS. 9A to 9F are section views of the harness main body of FIG. 8. Here, the composing parts of this embodiment, which are basically the same as those of the embodiments 1 and 2, are given the same designations and the detailed description thereof is omitted.

<Structure of Wire Harness 15>

In FIG. 8 and FIGS. 9A to 9F, a harness main body 19 constituting a long wire harness 15 includes a conduction path 21 and an exterior member 22 for storing and protecting the conduction path 21. In the exterior member 22, there are formed a plurality of fixed form insertion parts 26 and a plurality of narrow-width insertion parts 27 which are the characteristic part of the invention. The plurality of narrow-width insertion parts 27, in the embodiment 3, are formed such that oval section shapes oblong in the arrow line Q direction, oval section shapes long in an oblique direction and circular section shapes vertically long in the arrow line P direction are sequentially arranged. In other words, the narrow-width insertion parts 27 are arranged spirally around the tube axis such that the bending direction thereof can be changed properly.

Effects of Embodiment 3

The embodiment 3, of course, provides a similar effect to the embodiment 1. That is, advantageously, while paying attention to workability concerning insertion of the conduction path 21, vibration of the conduction path 21 within the exterior member 22 can be suppressed.

Moreover, of course, the invention can be variously modified within a range not changing the gist of the invention.

DESCRIPTION OF REFERENCE NUMERALS

1: Hybrid car
2: Engine
3: Motor unit
4: Inverter unit
5: Battery
6: Engine room
7: Car rear part
8, 9: Wire harness
10: Intermediate part
11: Vehicle under-floor
12: Junction block
13: Harness terminal
14: Shield connector
15: Wire harness
16: Low voltage battery
17: Car front part
18: Auxiliary device
19: Harness main body
20: Connector
21: Conduction path
22: Exterior member
23: Conductor
24: Insulator
25: Outer peripheral surface
26: Fixed form insertion part
27: Narrow-width insertion part

What is claimed is:

1. A wire harness comprising:
a tubular external member; and
one or a plurality of conduction paths inserted into the external member and protected by the external member,
wherein the external member includes at least one fixed form insertion part in which an inside width is wider than an outside width of the one or the plurality of conduction paths, and a plurality of narrow-width insertion parts which are elastically deformable and in which an inside width is narrower than the outside width of the one or the plurality of conduction paths, and
wherein the plurality of narrow-width insertion parts are arranged along a tube axial direction alternately and integrally with the at least one fixed form insertion part.

2. The wire harness according to claim 1,
wherein the plurality of narrow-width insertion parts reduce a play rate of the conduction path in the exterior member so as to suppress a vibration of the conduction path, have bellows tube shapes respectively, and regulate a bending direction of the wire harness.

3. A wire harness comprising:
an external member having a tubular shape; and
a conduction path inserted into the external member,
wherein the external member includes:
a fixed form insertion part; and
a narrow-width insertion part,
wherein, in the fixed form insertion part, an inside width of the external member is larger than an outside width of the conduction path throughout a whole circumference of the conduction path,
wherein, in the narrow-width insertion part, two points of an inner circumference of the external member elastically press corresponding points of an outer circumference of the conduction path toward radially inner sides of the conduction path to each other,
wherein the fixed form insertion part and narrow-width insertion part are alternatively arranged along a tube axial direction, and
wherein the fixed form insertion part and the narrow-width insertion part are integrally formed.

4. A manufacturing method for a wire harness including a tubular external member and a conduction path, the manufacturing method comprising:
preparing the external member, including a fixed form insertion part and a narrow-width insertion part which are alternatively arranged along a tube axial direction, the external member having an inside width which is larger than an outside width of the conduction path throughout a whole circumference of the conduction path, and the narrow-width insertion part having an inside width which is narrower than the outside width of the conduction path; and
inserting the conduction path into the exterior member while deforming the narrow-width insertion part.

* * * * *